(12) United States Patent
McGhie et al.

(10) Patent No.: US 8,313,023 B1
(45) Date of Patent: *Nov. 20, 2012

(54) EXCHANGE OF NON-NEGOTIABLE CREDITS OF AN ENTITY'S REWARDS PROGRAM FOR ENTITY INDEPENDENT FUNDS

(76) Inventors: Sean I. McGhie, Boca Raton, FL (US); Brian K. Buchheit, Davie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,904

(22) Filed: Jun. 25, 2012

Related U.S. Application Data

(63) Continuation of application No. 11/420,255, filed on May 25, 2006, now Pat. No. 7,703,673.

(51) Int. Cl.
*G06K 5/00* (2006.01)
(52) U.S. Cl. ......... 235/380; 235/375; 235/379; 235/487
(58) Field of Classification Search .................. 235/380, 235/375, 379, 487, 486; 705/14, 39
See application file for complete search history.

(56) References Cited

U.S. PATENT DOCUMENTS

| | | | |
|---|---|---|---|
| 3,918,716 | A | 11/1975 | Nonaka et al. |
| 4,087,660 | A | 5/1978 | Sedley |
| 4,358,672 | A | 11/1982 | Hyatt et al. |
| 4,473,825 | A | 9/1984 | Walton |
| 4,518,098 | A | 5/1985 | Fleischer |
| 4,546,241 | A | 10/1985 | Walton |
| 4,582,324 | A | 4/1986 | Koza et al. |
| 4,607,155 | A | 8/1986 | Nao et al. |
| 4,609,812 | A | 9/1986 | Drexler |
| 4,621,814 | A | 11/1986 | Stephan et al. |
| 4,634,848 | A | 1/1987 | Shinohara et al. |
| 4,689,742 | A | 8/1987 | Seymour et al. |
| 4,695,053 | A | 9/1987 | Vazquez |
| 4,760,527 | A | 7/1988 | Sidley |

(Continued)

FOREIGN PATENT DOCUMENTS

AU 6484498 11/1998

(Continued)

OTHER PUBLICATIONS

"At Sports Superstore Online, Shoppers Get More for Their Money; 10,000 Reasons to Shop at Sports Superstore Online", Business Wire Dec. 4, 1998, 2 pp.

(Continued)

*Primary Examiner* — Edwyn Labaze
(74) *Attorney, Agent, or Firm* — Patents on Demand P.A.; Brian K. Buchheit; Scott M. Garrett

(57) ABSTRACT

In one embodiment, a rewards program for credit cards (e.g., payment artifacts) can be established. Non-negotiable credits are accrued in response to one of the payment artifacts being used for purchases of goods or services with venders. Restrictions on use prevent the non-negotiable credits from being directly applied for a purchase of at least one goods or services of a commerce partner, which is an independent entity from the entity. A quantity of the non-negotiable credits are subtracted in response to the purchase of the goods or services that cost a quantity of entity independent funds, which result from a conversion of the subtracted quantity of non-negotiable credits into the entity independent funds in accordance with a credit to fund conversion ratio. The entity provides compensation for the subtracted quantity of the non-negotiable credits. The commerce partner receives at least a portion of the compensation.

46 Claims, 3 Drawing Sheets

U.S. PATENT DOCUMENTS

| | | |
|---|---|---|
| 4,764,666 A | 8/1988 | Bergeron |
| 4,882,473 A | 11/1989 | Bergeron |
| 4,910,672 A | 3/1990 | Off et al. |
| 4,941,090 A | 7/1990 | McCarthy |
| 4,942,090 A | 7/1990 | Morin |
| 4,968,873 A | 11/1990 | Dethloff |
| 5,025,372 A | 6/1991 | Burton et al. |
| 5,038,022 A | 8/1991 | Lucero |
| 5,056,019 A | 10/1991 | Schultz et al. |
| 5,080,364 A | 1/1992 | Seidman |
| 5,105,184 A | 4/1992 | Pirani et al. |
| 5,117,355 A | 5/1992 | McCarthy |
| 5,128,752 A | 7/1992 | Von Kohorn |
| 5,135,224 A | 8/1992 | Yamamoto |
| 5,173,851 A | 12/1992 | Off et al. |
| 5,179,517 A | 1/1993 | Sarbin et al. |
| 5,200,889 A | 4/1993 | Mori |
| 5,201,010 A | 4/1993 | McCarthy |
| 5,202,826 A | 4/1993 | McCarthy |
| 5,233,514 A | 8/1993 | Ayyoubi et al. |
| 5,237,620 A | 8/1993 | Deaton et al. |
| 5,256,863 A | 10/1993 | Ferguson et al. |
| 5,265,874 A | 11/1993 | Dickinson |
| 5,276,312 A | 1/1994 | McCarthy |
| 5,287,268 A | 2/1994 | McCarthy |
| 5,287,269 A | 2/1994 | Dorrough et al. |
| 5,290,033 A | 3/1994 | Bittner et al. |
| 5,305,196 A | 4/1994 | Deaton et al. |
| 5,327,508 A | 7/1994 | Deaton et al. |
| 5,332,076 A | 7/1994 | Ziegert |
| 5,344,144 A | 9/1994 | Canon |
| 5,353,218 A | 10/1994 | De Lapa et al. |
| 5,371,345 A | 12/1994 | LeStrange et al. |
| 5,373,440 A | 12/1994 | Cohen et al. |
| 5,382,779 A | 1/1995 | Gupta |
| 5,388,165 A | 2/1995 | Deaton et al. |
| 5,393,061 A | 2/1995 | Manship et al. |
| 5,397,125 A | 3/1995 | Adams |
| 5,398,932 A | 3/1995 | Eberhardt et al. |
| 5,402,872 A | 4/1995 | Clurman |
| 5,424,524 A | 6/1995 | Ruppert et al. |
| 5,429,361 A | 7/1995 | Raven et al. |
| 5,430,644 A | 7/1995 | Deaton et al. |
| 5,434,394 A | 7/1995 | Roach et al. |
| 5,448,471 A | 9/1995 | Deaton et al. |
| 5,457,306 A | 10/1995 | Lucero |
| 5,457,308 A | 10/1995 | Lucero |
| 5,467,269 A | 11/1995 | Flaten |
| 5,470,079 A | 11/1995 | LeStrange et al. |
| 5,471,669 A | 11/1995 | Lidman |
| 5,477,038 A | 12/1995 | Levine et al. |
| 5,483,444 A | 1/1996 | Heintzeman et al. |
| 5,491,326 A | 2/1996 | Marceau et al. |
| 5,502,363 A | 3/1996 | Clarke |
| 5,511,781 A | 4/1996 | Wood et al. |
| 5,513,102 A | 4/1996 | Auriemma |
| 5,529,361 A | 6/1996 | Raven |
| 5,535,407 A | 7/1996 | Yanagawa et al. |
| 5,537,314 A | 7/1996 | Kanter |
| 5,551,692 A | 9/1996 | Pettit et al. |
| 5,559,312 A | 9/1996 | Lucero |
| 5,559,313 A | 9/1996 | Claus et al. |
| 5,564,546 A | 10/1996 | Molbak et al. |
| 5,564,700 A | 10/1996 | Celona |
| 5,580,309 A | 12/1996 | Piechowiak |
| 5,586,936 A | 12/1996 | Bennett et al. |
| 5,592,560 A | 1/1997 | Deaton et al. |
| 5,609,337 A | 3/1997 | Clapper, Jr. |
| 5,612,868 A | 3/1997 | Off et al. |
| 5,613,912 A | 3/1997 | Slater |
| 5,621,812 A | 4/1997 | Deaton et al. |
| 5,635,696 A | 6/1997 | Dabrowski |
| 5,638,457 A | 6/1997 | Deaton et al. |
| 5,642,485 A | 6/1997 | Deaton et al. |
| 5,643,088 A | 7/1997 | Vaughn et al. |
| 5,644,723 A | 7/1997 | Deaton et al. |
| 5,649,114 A | 7/1997 | Deaton et al. |
| 5,649,115 A | 7/1997 | Schrader et al. |
| 5,655,961 A | 8/1997 | Acres et al. |
| 5,659,469 A | 8/1997 | Deaton et al. |
| 5,672,109 A | 9/1997 | Natanian |
| 5,673,322 A | 9/1997 | Pepe et al. |
| 5,674,123 A | 10/1997 | Roberson, Jr. et al. |
| 5,674,128 A | 10/1997 | Holch |
| 5,675,662 A | 10/1997 | Deaton et al. |
| 5,677,952 A | 10/1997 | Blakley, III et al. |
| 5,687,322 A | 11/1997 | Deaton et al. |
| 5,689,100 A | 11/1997 | Carrithers et al. |
| 5,697,611 A | 12/1997 | Kelly et al. |
| 5,708,782 A | 1/1998 | Larson et al. |
| 5,710,886 A | 1/1998 | Christensen et al. |
| 5,715,399 A | 2/1998 | Bezoz |
| 5,725,428 A | 3/1998 | Achmuller |
| 5,729,693 A | 3/1998 | Holda-Fleck |
| 5,734,838 A | 3/1998 | Robinson et al. |
| 5,741,183 A | 4/1998 | Acres |
| 5,742,845 A | 4/1998 | Wagner |
| 5,749,075 A | 5/1998 | Toader et al. |
| 5,754,655 A | 5/1998 | Hughes |
| 5,761,647 A | 6/1998 | Boushy |
| 5,761,648 A | 6/1998 | Golden et al. |
| 5,765,141 A | 6/1998 | Spector |
| 5,766,075 A | 6/1998 | Cook et al. |
| 5,769,716 A | 6/1998 | Saffari et al. |
| 5,770,533 A | 6/1998 | Franchi |
| 5,774,868 A | 6/1998 | Cragun et al. |
| 5,774,869 A | 6/1998 | Toader |
| 5,774,870 A | 6/1998 | Storey |
| 5,779,549 A | 7/1998 | Walker et al. |
| 5,794,230 A | 8/1998 | Horadan et al. |
| 5,802,275 A | 9/1998 | Blonder |
| 5,806,043 A | 9/1998 | Toader |
| 5,806,044 A | 9/1998 | Powell |
| 5,806,045 A | 9/1998 | Biorge et al. |
| 5,809,482 A | 9/1998 | Strisower |
| 5,814,796 A | 9/1998 | Benson et al. |
| 5,816,918 A | 10/1998 | Kelly et al. |
| 5,820,460 A | 10/1998 | Fulton |
| 5,822,230 A | 10/1998 | Kikinis et al. |
| 5,823,874 A | 10/1998 | Adams |
| 5,832,457 A | 11/1998 | O'Brien et al. |
| 5,832,458 A | 11/1998 | Jones |
| 5,833,536 A | 11/1998 | Davids et al. |
| 5,834,748 A | 11/1998 | Litman |
| 5,836,817 A | 11/1998 | Acres |
| 5,839,117 A | 11/1998 | Cameron et al. |
| 5,844,230 A | 12/1998 | Lalonde |
| 5,845,259 A | 12/1998 | West et al. |
| 5,848,399 A | 12/1998 | Burke |
| 5,851,148 A | 12/1998 | Brune et al. |
| 5,855,007 A | 12/1998 | Jovicic et al. |
| D404,436 S | 1/1999 | McGahn et al. |
| 5,857,175 A | 1/1999 | Day et al. |
| 5,864,822 A | 1/1999 | Baker, III |
| RE36,116 E | 2/1999 | McCarthy |
| 5,870,722 A | 2/1999 | Albert et al. |
| 5,876,284 A | 3/1999 | Acres et al. |
| 5,882,261 A | 3/1999 | Adams |
| 5,882,262 A | 3/1999 | Balhorn |
| 5,884,277 A | 3/1999 | Khosla |
| 5,892,827 A | 4/1999 | Beach et al. |
| 5,892,900 A | 4/1999 | Ginter et al. |
| 5,892,905 A | 4/1999 | Brandt et al. |
| 5,898,838 A | 4/1999 | Wagner |
| 5,902,184 A | 5/1999 | Bennett |
| 5,902,983 A | 5/1999 | Crevelt et al. |
| 5,903,874 A | 5/1999 | Leonard et al. |
| 5,903,880 A | 5/1999 | Biffar |
| 5,905,246 A | 5/1999 | Fajkowski |
| 5,905,908 A | 5/1999 | Wagner |
| 5,907,830 A | 5/1999 | Engel et al. |
| 5,907,831 A | 5/1999 | Lotvin et al. |
| 5,909,023 A | 6/1999 | Ono et al. |
| 5,909,486 A | 6/1999 | Walker et al. |
| 5,911,418 A | 6/1999 | Adams |
| 5,913,210 A | 6/1999 | Call |
| 5,915,007 A | 6/1999 | Klapka |

| Patent No. | Date | Inventor |
|---|---|---|
| 5,915,019 A | 6/1999 | Ginter et al. |
| 5,915,243 A | 6/1999 | Smolen |
| 5,915,244 A | 6/1999 | Jack et al. |
| 5,918,211 A | 6/1999 | Sloane |
| 5,918,213 A | 6/1999 | Bernard et al. |
| 5,918,214 A | 6/1999 | Perkowski |
| 5,919,091 A | 7/1999 | Bell |
| 5,920,847 A | 7/1999 | Kolling et al. |
| 5,923,016 A | 7/1999 | Fredregill et al. |
| 5,933,811 A | 8/1999 | Angles et al. |
| 5,935,000 A | 8/1999 | Sanchez, III |
| 5,937,391 A | 8/1999 | Ikeda et al. |
| 5,937,394 A | 8/1999 | Wong et al. |
| 5,938,727 A | 8/1999 | Ikeda |
| 5,940,506 A | 8/1999 | Chang et al. |
| 5,941,771 A | 8/1999 | Haste, III |
| 5,941,772 A | 8/1999 | Paige |
| 5,943,241 A | 8/1999 | Nichols et al. |
| 5,946,664 A | 8/1999 | Ebisawa |
| 5,947,820 A | 9/1999 | Morro et al. |
| 5,949,042 A | 9/1999 | Dietz, II et al. |
| 5,950,173 A | 9/1999 | Perkowski |
| 5,951,397 A | 9/1999 | Dickinson |
| 5,952,638 A | 9/1999 | Demers et al. |
| 5,953,005 A | 9/1999 | Liu |
| 5,956,038 A | 9/1999 | Rekimoto |
| 5,956,695 A | 9/1999 | Carrithers et al. |
| 5,956,700 A | 9/1999 | Landry |
| 5,959,277 A | 9/1999 | Lucero |
| 5,967,896 A | 10/1999 | Jorasch et al. |
| 5,970,469 A | 10/1999 | Scroggie et al. |
| 5,970,470 A | 10/1999 | Walker |
| 5,971,277 A | 10/1999 | Cragun et al. |
| 5,974,135 A | 10/1999 | Breneman et al. |
| 5,974,398 A | 10/1999 | Hanson et al. |
| 5,978,777 A | 11/1999 | Garnier |
| 5,979,757 A | 11/1999 | Tracy et al. |
| 5,980,385 A | 11/1999 | Clapper |
| 5,982,520 A | 11/1999 | Weiser et al. |
| 5,983,196 A | 11/1999 | Wendkos |
| 5,983,205 A | 11/1999 | Brams et al. |
| 5,984,191 A | 11/1999 | Chapin, Jr. |
| 5,988,500 A | 11/1999 | Litman |
| 5,991,376 A | 11/1999 | Hennessy et al. |
| 5,991,736 A | 11/1999 | Ferguson et al. |
| 5,992,738 A | 11/1999 | Matsumoto et al. |
| 5,992,752 A | 11/1999 | Wilz, Sr. et al. |
| 5,993,316 A | 11/1999 | Coyle |
| 5,995,942 A | 11/1999 | Smith et al. |
| 5,999,324 A | 12/1999 | Hopkins |
| 5,999,914 A | 12/1999 | Blinn et al. |
| 6,000,608 A | 12/1999 | Dorf |
| 6,002,771 A | 12/1999 | Nielsen |
| 6,003,013 A | 12/1999 | Boushy et al. |
| 6,007,426 A | 12/1999 | Kelly et al. |
| 6,009,411 A | 12/1999 | Kepecs |
| 6,009,412 A | 12/1999 | Storey |
| 6,009,458 A | 12/1999 | Hawkins |
| 6,012,038 A | 1/2000 | Hoffman et al. |
| 6,012,051 A | 1/2000 | Sammon, Jr. et al. |
| 6,012,636 A | 1/2000 | Smith |
| 6,014,594 A | 1/2000 | Heidel |
| 6,014,634 A | 1/2000 | Scroggie et al. |
| 6,014,635 A | 1/2000 | Harris et al. |
| 6,015,344 A | 1/2000 | Kelly et al. |
| 6,016,476 A | 1/2000 | Maes et al. |
| 6,018,695 A | 1/2000 | Ahrens et al. |
| 6,018,718 A | 1/2000 | Walker et al. |
| 6,018,724 A | 1/2000 | Arent |
| 6,021,399 A | 2/2000 | Demers et al. |
| 6,024,640 A | 2/2000 | Walker et al. |
| 6,026,370 A | 2/2000 | Jermyn |
| 6,026,375 A | 2/2000 | Hall et al. |
| 6,026,377 A | 2/2000 | Burke |
| 6,032,133 A | 2/2000 | Hilt et al. |
| 6,032,136 A | 2/2000 | Brake, Jr. et al. |
| 6,032,955 A | 3/2000 | Luciano et al. |
| 6,035,280 A | 3/2000 | Christensen |
| 6,035,281 A | 3/2000 | Crosskey et al. |
| 6,036,601 A | 3/2000 | Heckel |
| 6,038,321 A | 3/2000 | Torigai et al. |
| 6,039,244 A | 3/2000 | Finsterwald |
| 6,039,648 A | 3/2000 | Guinn |
| 6,041,308 A | 3/2000 | Walker et al. |
| 6,041,309 A | 3/2000 | Laor |
| 6,044,360 A | 3/2000 | Picciallo |
| 6,047,269 A | 4/2000 | Biffar |
| 6,048,269 A | 4/2000 | Burns et al. |
| 6,049,778 A | 4/2000 | Walker et al. |
| 6,049,779 A | 4/2000 | Berkson |
| 6,055,573 A | 4/2000 | Gardenswartz et al. |
| 6,058,371 A | 5/2000 | Djian |
| 6,058,482 A | 5/2000 | Liu |
| 6,061,660 A | 5/2000 | Eggleston et al. |
| 6,062,980 A | 5/2000 | Luciano |
| 6,064,979 A | 5/2000 | Perkowski |
| 6,064,987 A | 5/2000 | Walker |
| 6,065,120 A | 5/2000 | Laursen et al. |
| 6,068,533 A | 5/2000 | Parker |
| 6,068,553 A | 5/2000 | Parker |
| 6,072,468 A | 6/2000 | Hocker et al. |
| 6,073,840 A | 6/2000 | Marion |
| 6,075,863 A | 6/2000 | Krishnan et al. |
| 6,076,101 A | 6/2000 | Kamakura et al. |
| 6,078,898 A | 6/2000 | Davis et al. |
| 6,081,900 A | 6/2000 | Subramaniam et al. |
| 6,088,730 A | 7/2000 | Kato et al. |
| 6,089,982 A | 7/2000 | Holch |
| 6,092,069 A | 7/2000 | Johnson et al. |
| 6,092,201 A | 7/2000 | Turnbull et al. |
| 6,094,486 A | 7/2000 | Marchant |
| 6,098,837 A | 8/2000 | Izawa |
| 6,101,483 A | 8/2000 | Petrovich et al. |
| 6,101,484 A | 8/2000 | Halbert et al. |
| 6,101,485 A | 8/2000 | Fortenberry et al. |
| 6,105,001 A | 8/2000 | Masi et al. |
| 6,105,865 A | 8/2000 | Hardesty |
| 6,110,041 A | 8/2000 | Walker et al. |
| 6,110,042 A | 8/2000 | Walker et al. |
| 6,113,098 A | 9/2000 | Adams |
| 6,113,495 A | 9/2000 | Walker et al. |
| 6,115,737 A | 9/2000 | Ely et al. |
| 6,119,229 A | 9/2000 | Martinez |
| 6,119,230 A | 9/2000 | Carter |
| 6,124,947 A | 9/2000 | Sea |
| 6,128,599 A | 10/2000 | Walker et al. |
| 6,128,603 A | 10/2000 | Dent et al. |
| 6,129,274 A | 10/2000 | Suzuki |
| 6,131,810 A | 10/2000 | Weiss et al. |
| 6,134,318 A | 10/2000 | O'Neil |
| 6,134,548 A | 10/2000 | Gottsman et al. |
| 6,138,911 A | 10/2000 | Fredregill et al. |
| 6,139,431 A | 10/2000 | Walker et al. |
| 6,141,161 A | 10/2000 | Sato et al. |
| 6,141,653 A | 10/2000 | Conklin |
| 6,141,684 A | 10/2000 | McDonald et al. |
| 6,145,739 A | 11/2000 | Bertina et al. |
| 6,148,405 A | 11/2000 | Liao et al. |
| 6,154,214 A | 11/2000 | Uyehara et al. |
| 6,161,096 A | 12/2000 | Bell |
| 6,162,122 A | 12/2000 | Acres |
| 6,164,533 A | 12/2000 | Barton |
| 6,165,071 A | 12/2000 | Weiss |
| 6,168,522 B1 | 1/2001 | Walker et al. |
| 6,173,267 B1 | 1/2001 | Cairns |
| 6,178,407 B1 | 1/2001 | Lotvin et al. |
| 6,178,408 B1 | 1/2001 | Copple et al. |
| 6,182,894 B1 | 2/2001 | Hackett et al. |
| 6,183,362 B1 | 2/2001 | Boushy |
| 6,183,366 B1 | 2/2001 | Goldberg et al. |
| 6,185,541 B1 | 2/2001 | Scroggie et al. |
| 6,186,893 B1 | 2/2001 | Walker et al. |
| 6,186,894 B1 | 2/2001 | Mayeroff |
| 6,189,103 B1 | 2/2001 | Nevarez et al. |
| 6,193,608 B1 | 2/2001 | Walker et al. |
| 6,195,677 B1 | 2/2001 | Utsumi |
| 6,196,458 B1 | 3/2001 | Walker et al. |
| 6,199,099 B1 | 3/2001 | Gershman et al. |

| Patent No. | Date | Name |
|---|---|---|
| 6,216,129 B1 | 4/2001 | Eldering |
| 6,222,914 B1 | 4/2001 | McMullin |
| 6,224,483 B1 | 5/2001 | Mayeroff |
| 6,227,972 B1 | 5/2001 | Walker et al. |
| 6,229,533 B1 | 5/2001 | Farmer |
| 6,231,442 B1 | 5/2001 | Mayeroff |
| 6,234,896 B1 | 5/2001 | Walker et al. |
| 6,236,978 B1 | 5/2001 | Tuzhilin |
| 6,243,688 B1 | 6/2001 | Kalina |
| 6,244,958 B1 | 6/2001 | Acres |
| 6,249,773 B1 | 6/2001 | Allard et al. |
| 6,267,671 B1 | 7/2001 | Hogan |
| 6,273,820 B1 | 8/2001 | Haste, III |
| 6,280,326 B1 | 8/2001 | Saunders |
| 6,280,328 B1 | 8/2001 | Holch |
| 6,289,261 B1 | 9/2001 | Heidel |
| 6,289,322 B1 | 9/2001 | Kitchen et al. |
| 6,292,786 B1 | 9/2001 | Deaton et al. |
| 6,293,865 B1 | 9/2001 | Kelly et al. |
| 6,293,866 B1 | 9/2001 | Walker et al. |
| 6,293,867 B1 | 9/2001 | Heidel |
| 6,298,335 B1 | 10/2001 | Bernstein |
| 6,302,793 B1 | 10/2001 | Fertitta, III |
| 6,306,035 B1 | 10/2001 | Kelly et al. |
| 6,311,976 B1 | 11/2001 | Yoseloff et al. |
| 6,312,333 B1 | 11/2001 | Acres |
| 6,315,665 B1 | 11/2001 | Faith |
| 6,319,125 B1 | 11/2001 | Acres |
| 6,327,573 B1 | 12/2001 | Walker et al. |
| 6,332,099 B1 | 12/2001 | Heidel |
| 6,332,157 B1 | 12/2001 | Mighdoli et al. |
| 6,341,353 B1 | 1/2002 | Herman |
| 6,345,261 B1 | 2/2002 | Feidelson et al. |
| 6,352,175 B2 | 3/2002 | Izawa |
| 6,358,149 B1 | 3/2002 | Schneider et al. |
| 6,363,362 B1 | 3/2002 | Burfield et al. |
| 6,379,247 B1 | 4/2002 | Walker et al. |
| 6,394,907 B1 | 5/2002 | Rowe |
| 6,402,029 B1 | 6/2002 | Gangi |
| 6,408,284 B1 | 6/2002 | Hill et al. |
| 6,431,983 B2 | 8/2002 | Acres |
| 6,438,527 B1 | 8/2002 | Powar |
| 6,452,498 B2 | 9/2002 | Stewart |
| 6,476,830 B1 | 11/2002 | Farmer |
| 6,484,940 B1 | 11/2002 | Dilday et al. |
| 6,486,788 B1 | 11/2002 | French et al. |
| 6,491,584 B2 | 12/2002 | Graham |
| 6,505,772 B1 | 1/2003 | Mollett et al. |
| 6,510,998 B1 | 1/2003 | Stanford et al. |
| 6,511,377 B1 | 1/2003 | Weiss |
| 6,522,889 B1 | 2/2003 | Aarnio |
| 6,533,664 B1 | 3/2003 | Crumby |
| 6,547,131 B1 | 4/2003 | Foodman |
| 6,549,912 B1 | 4/2003 | Chen |
| 6,554,705 B1 | 4/2003 | Cumbers |
| 6,572,471 B1 | 6/2003 | Bennett |
| 6,575,832 B1 | 6/2003 | Manfredi et al. |
| 6,578,015 B1 | 6/2003 | Haseltine et al. |
| 6,579,179 B2 | 6/2003 | Poole et al. |
| 6,601,040 B1 | 7/2003 | Kolls |
| 6,607,441 B1 | 8/2003 | Acres |
| 6,609,150 B2 | 8/2003 | Lee et al. |
| 6,609,969 B1 | 8/2003 | Luciano |
| 6,609,970 B1 | 8/2003 | Luciano |
| 6,609,978 B1 | 8/2003 | Paulsen |
| 6,623,357 B2 | 9/2003 | Chowdhury |
| 6,631,358 B1 | 10/2003 | Ogilvie |
| 6,631,849 B2 | 10/2003 | Blossom |
| 6,645,077 B2 | 11/2003 | Rowe |
| 6,648,755 B1 | 11/2003 | Luciano, Jr. |
| 6,656,050 B2 | 12/2003 | Busch |
| 6,685,559 B2 | 2/2004 | Luciano |
| 6,687,679 B1 | 2/2004 | Van Luchene et al. |
| 6,721,743 B1 | 4/2004 | Sakakibara |
| 6,748,365 B1 | 6/2004 | Quinlan et al. |
| 6,800,029 B2 | 10/2004 | Rowe |
| 6,813,609 B2 | 11/2004 | Wilson |
| 6,820,061 B2 | 11/2004 | Postrel |
| 6,826,594 B1 | 11/2004 | Pettersen |
| 6,829,586 B2 | 12/2004 | Postrel |
| 6,842,739 B2 | 1/2005 | Postrel |
| 6,843,720 B2 | 1/2005 | Luciano |
| 6,846,238 B2 | 1/2005 | Wells |
| 6,852,031 B1 | 2/2005 | Rowe |
| 6,856,976 B2 | 2/2005 | Bible et al. |
| 6,866,586 B2 | 3/2005 | Oberberger |
| 6,898,570 B1 | 5/2005 | Tedesco et al. |
| 6,915,271 B1 | 7/2005 | Meyer et al. |
| 6,920,611 B1 | 7/2005 | Spaeth et al. |
| 6,929,550 B2 | 8/2005 | Hisada |
| 6,931,538 B1 | 8/2005 | Sawaguchi |
| 6,947,898 B2 | 9/2005 | Postrel |
| 6,951,302 B2 | 10/2005 | Potts |
| 6,985,876 B1 | 1/2006 | Lee |
| 6,997,807 B2 | 2/2006 | Weiss |
| 7,003,496 B2 | 2/2006 | Ishii |
| 7,025,674 B2 | 4/2006 | Adams et al. |
| 7,043,752 B2 | 5/2006 | Royer et al. |
| 7,072,864 B2 | 7/2006 | Brake, Jr. et al. |
| 7,096,190 B2 | 8/2006 | Postrel |
| 7,127,414 B1 | 10/2006 | Awadallah et al. |
| 7,128,652 B1 | 10/2006 | Lavoie |
| 7,130,828 B2 | 10/2006 | Phillips et al. |
| 7,134,959 B2 | 11/2006 | Penrice |
| 7,137,883 B1 | 11/2006 | Falciglia |
| 7,146,342 B1 | 12/2006 | Angelin |
| 7,168,089 B2 | 1/2007 | Nguyen |
| 7,174,315 B2 | 2/2007 | Phillips et al. |
| 7,187,947 B1 | 3/2007 | White et al. |
| 7,200,571 B1 | 4/2007 | Jenninges et al. |
| 7,249,139 B2 | 7/2007 | Chuah |
| 7,249,197 B1 | 7/2007 | Roestenburg et al. |
| 7,289,970 B1 | 10/2007 | Siegel |
| 7,290,061 B2 | 10/2007 | Lentini et al. |
| 7,291,064 B2 | 11/2007 | Yamada |
| 7,321,901 B1 | 1/2008 | Blinn et al. |
| 7,349,867 B2 | 3/2008 | Rollins et al. |
| 7,360,693 B1 | 4/2008 | Sullivan |
| 7,387,571 B2 | 6/2008 | Walker |
| 7,390,264 B2 | 6/2008 | Walker |
| 7,398,226 B2 | 7/2008 | Haines et al. |
| 7,455,586 B2 | 11/2008 | Nguyen |
| 7,613,629 B2 | 11/2009 | Antonucci et al. |
| 7,641,547 B2 | 1/2010 | Walker et al. |
| 7,680,688 B2 | 3/2010 | Hessburg |
| 7,703,673 B2 | 4/2010 | Buchheit et al. |
| 7,747,463 B1 | 6/2010 | Phillips et al. |
| 7,765,124 B2 | 7/2010 | Postrel |
| 7,827,056 B2 | 11/2010 | Walker et al. |
| 7,827,057 B1 | 11/2010 | De Lapa et al. |
| 7,828,206 B2 | 11/2010 | Hessburg et al. |
| 7,856,376 B2 | 12/2010 | Storey |
| 7,886,011 B2 | 2/2011 | Buchheit |
| 8,046,256 B2 | 10/2011 | Chien et al. |
| 8,062,116 B2 | 11/2011 | Lutnick et al. |
| 8,100,758 B2 | 1/2012 | Walker et al. |
| 8,123,127 B2 | 2/2012 | McGhie et al. |
| 8,162,209 B2 | 4/2012 | Buchheit et al. |
| 8,181,863 B1 | 5/2012 | McGhie et al. |
| 8,181,864 B1 | 5/2012 | McGhie et al. |
| 8,186,583 B1 | 5/2012 | McGhie et al. |
| 8,201,734 B1 | 6/2012 | McGhie et al. |
| 8,234,164 B2 | 7/2012 | Walker et al. |
| 2001/0032137 A1 | 10/2001 | Bennett et al. |
| 2001/0032182 A1 | 10/2001 | Kumar et al. |
| 2001/0032183 A1 | 10/2001 | Landry |
| 2001/0034259 A1 | 10/2001 | Luciano et al. |
| 2001/0034649 A1 | 10/2001 | Acres |
| 2001/0034653 A1 | 10/2001 | Yamamoto |
| 2001/0034720 A1 | 10/2001 | Breck |
| 2001/0037295 A1 | 11/2001 | Olsen |
| 2001/0041610 A1 | 11/2001 | Luciano et al. |
| 2001/0044337 A1 | 11/2001 | Rowe |
| 2001/0046891 A1 | 11/2001 | Acres |
| 2001/0047342 A1 | 11/2001 | Cuervo |
| 2001/0054003 A1 | 12/2001 | Chien et al. |
| 2002/0002075 A1 | 1/2002 | Rowe |
| 2002/0002532 A1 | 1/2002 | Tso |

| | | | | | | |
|---|---|---|---|---|---|---|
| 2002/0002538 A1 | 1/2002 | Ling | | 2003/0130948 A1 | 7/2003 | Algiene et al. |
| 2002/0010025 A1 | 1/2002 | Kelly et al. | | 2003/0148807 A1 | 8/2003 | Acres |
| 2002/0013728 A1 | 1/2002 | Wilkman | | 2003/0163425 A1 | 8/2003 | Cannon, Jr. |
| 2002/0013767 A1 | 1/2002 | Katz | | 2003/0182218 A1 | 9/2003 | Blagg |
| 2002/0016734 A1 | 2/2002 | McGill et al. | | 2003/0186747 A1 | 10/2003 | Nguyen |
| 2002/0020965 A1 | 2/2002 | Potter | | 2003/0187762 A1 | 10/2003 | Coyle |
| 2002/0026348 A1 | 2/2002 | Fowler et al. | | 2003/0200142 A1 | 10/2003 | Hicks et al. |
| 2002/0039923 A1 | 4/2002 | Cannon | | 2003/0200144 A1 | 10/2003 | Antonucci et al. |
| 2002/0045476 A1 | 4/2002 | Poole | | 2003/0208445 A1 | 11/2003 | Compiano |
| 2002/0046110 A1 | 4/2002 | Gallagher | | 2003/0211883 A1 | 11/2003 | Potts |
| 2002/0049631 A1 | 4/2002 | Williams | | 2003/0216960 A1 | 11/2003 | Postrel |
| 2002/0052940 A1 | 5/2002 | Myers et al. | | 2003/0216967 A1 | 11/2003 | Williams |
| 2002/0055874 A1 | 5/2002 | Cohen | | 2003/0228902 A1 | 12/2003 | Walker |
| 2002/0056044 A1 | 5/2002 | Andersson | | 2003/0229584 A1 | 12/2003 | Brown |
| 2002/0062253 A1 | 5/2002 | Dosh et al. | | 2003/0236749 A1 | 12/2003 | Shergalis |
| 2002/0065126 A1 | 5/2002 | Miller et al. | | 2004/0002369 A1 | 1/2004 | Walker et al. |
| 2002/0068624 A1 | 6/2002 | Ellis | | 2004/0006531 A1 | 1/2004 | Kwan |
| 2002/0069109 A1 | 6/2002 | Wendkos | | 2004/0015438 A1 | 1/2004 | Compiano et al. |
| 2002/0069150 A1 | 6/2002 | Ni | | 2004/0019522 A1 | 1/2004 | Bortolin |
| 2002/0072412 A1 | 6/2002 | Young | | 2004/0019560 A1 | 1/2004 | Evans et al. |
| 2002/0075844 A1 | 6/2002 | Hagen | | 2004/0035923 A1 | 2/2004 | Kahr |
| 2002/0077173 A1 | 6/2002 | Luciano et al. | | 2004/0039644 A1 | 2/2004 | Postrel |
| 2002/0077890 A1 | 6/2002 | LaPointe et al. | | 2004/0039692 A1 | 2/2004 | Shields et al. |
| 2002/0077978 A1 | 6/2002 | O'Leary et al. | | 2004/0043806 A1 | 3/2004 | Kirby |
| 2002/0082918 A1 | 6/2002 | Warwick | | 2004/0048658 A1 | 3/2004 | Sanders |
| 2002/0082920 A1 | 6/2002 | Austin | | 2004/0049439 A1 | 3/2004 | Johnston et al. |
| 2002/0082990 A1 | 6/2002 | Jones | | 2004/0053693 A1 | 3/2004 | An |
| 2002/0086733 A1 | 7/2002 | Wang | | 2004/0068438 A1 | 4/2004 | Mitchell |
| 2002/0087468 A1 | 7/2002 | Ganesan et al. | | 2004/0078273 A1 | 4/2004 | Loeb et al. |
| 2002/0091593 A1 | 7/2002 | Fowler | | 2004/0097287 A1 | 5/2004 | Postrel |
| 2002/0095365 A1 | 7/2002 | Slavin et al. | | 2004/0098317 A1 | 5/2004 | Postrel |
| 2002/0107072 A1 | 8/2002 | Giobbi | | 2004/0107140 A1 | 6/2004 | Postrel |
| 2002/0107733 A1 | 8/2002 | Liu et al. | | 2004/0111346 A1 | 6/2004 | Macbeath |
| 2002/0111210 A1 | 8/2002 | Luciano, Jr. | | 2004/0111366 A1 | 6/2004 | Schneider |
| 2002/0111907 A1 | 8/2002 | Ling | | 2004/0128197 A1 | 7/2004 | Bam |
| 2002/0111919 A1 | 8/2002 | Weller et al. | | 2004/0143500 A1 | 7/2004 | Lopez |
| 2002/0116257 A1 | 8/2002 | Helbig | | 2004/0143501 A1 | 7/2004 | Lopez |
| 2002/0120513 A1 | 8/2002 | Webb et al. | | 2004/0158492 A1 | 8/2004 | Lopez |
| 2002/0123949 A1 | 9/2002 | VanLeeuwen | | 2004/0173673 A1 | 9/2004 | Potts |
| 2002/0143614 A1 | 10/2002 | MacLean et al. | | 2004/0215505 A1 | 10/2004 | Sullivan |
| 2002/0146018 A1 | 10/2002 | Kailamaki et al. | | 2004/0220854 A1 | 11/2004 | Postrel |
| 2002/0147047 A1 | 10/2002 | Letovsky | | 2004/0229671 A1 | 11/2004 | Stronach |
| 2002/0152116 A1 | 10/2002 | Yan | | 2004/0262381 A1 | 12/2004 | Mesaros |
| 2002/0160838 A1 | 10/2002 | Kim | | 2005/0015332 A1 | 1/2005 | Chen |
| 2002/0161630 A1 | 10/2002 | Kern et al. | | 2005/0021399 A1 | 1/2005 | Postrel |
| 2002/0169021 A1 | 11/2002 | Urie | | 2005/0021400 A1 | 1/2005 | Postrel |
| 2002/0169660 A1 | 11/2002 | Taylor et al. | | 2005/0021401 A1 | 1/2005 | Postrel |
| 2002/0177479 A1 | 11/2002 | Walker | | 2005/0021457 A1 | 1/2005 | Johnston et al. |
| 2002/0194069 A1 | 12/2002 | Thakur et al. | | 2005/0043082 A1 | 2/2005 | Peterson |
| 2002/0198043 A1 | 12/2002 | Chowdhury | | 2005/0060225 A1 | 3/2005 | Postrel |
| 2003/0003996 A1 | 1/2003 | Nguyen | | 2005/0080727 A1 | 4/2005 | Postrel |
| 2003/0004802 A1 | 1/2003 | Callegari | | 2005/0080728 A1 | 4/2005 | Sobek |
| 2003/0004808 A1 | 1/2003 | Elhaossine et al. | | 2005/0096124 A1 | 5/2005 | Stronach |
| 2003/0008707 A1 | 1/2003 | Walker et al. | | 2005/0107155 A1 | 5/2005 | Potts et al. |
| 2003/0009379 A1 | 1/2003 | Narasimhan et al. | | 2005/0137015 A1 | 6/2005 | Rogers |
| 2003/0013438 A1 | 1/2003 | Darby | | 2005/0143174 A1 | 6/2005 | Goldman |
| 2003/0018523 A1 | 1/2003 | Rappaport et al. | | 2005/0149394 A1 | 7/2005 | Postrel |
| 2003/0033534 A1 | 2/2003 | Rand | | 2005/0177428 A1 | 8/2005 | Ganz |
| 2003/0036425 A1 | 2/2003 | Kaminkow et al. | | 2005/0177519 A1 | 8/2005 | Block |
| 2003/0040964 A1 | 2/2003 | Lacek | | 2005/0182693 A1 | 8/2005 | Alivandi |
| 2003/0045353 A1 | 3/2003 | Paulsen | | 2005/0192864 A1 | 9/2005 | Ganz |
| 2003/0050831 A1 | 3/2003 | Klayh | | 2005/0240472 A1 | 10/2005 | Postrel |
| 2003/0055722 A1 | 3/2003 | Perreault et al. | | 2005/0250415 A1 | 11/2005 | Barthold |
| 2003/0055780 A1 | 3/2003 | Hansen et al. | | 2005/0261056 A1 | 11/2005 | Smolucha |
| 2003/0060264 A1 | 3/2003 | Chilton | | 2006/0004629 A1 | 1/2006 | Neemann et al. |
| 2003/0061097 A1 | 3/2003 | Walker | | 2006/0020511 A1 | 1/2006 | Postrel |
| 2003/0062242 A1 | 4/2003 | Hallowell et al. | | 2006/0035692 A1 | 2/2006 | Kirby |
| 2003/0069787 A1 | 4/2003 | Tendon et al. | | 2006/0046827 A1 | 3/2006 | Saffari et al. |
| 2003/0069842 A1 | 4/2003 | Kight et al. | | 2006/0052150 A1 | 3/2006 | Hedrick et al. |
| 2003/0074311 A1 | 4/2003 | Saylors et al. | | 2006/0063580 A1 | 3/2006 | Nguyen |
| 2003/0078094 A1 | 4/2003 | Gatto | | 2006/0079150 A1 | 4/2006 | Filoseta |
| 2003/0083943 A1 | 5/2003 | Adams et al. | | 2006/0100018 A1 | 5/2006 | Ganz |
| 2003/0087650 A1 | 5/2003 | Aarnio | | 2006/0148559 A1 | 7/2006 | Jordan |
| 2003/0087692 A1 | 5/2003 | Weiss | | 2006/0178217 A1 | 8/2006 | Jung |
| 2003/0101131 A1 | 5/2003 | Warren et al. | | 2006/0178899 A1 | 8/2006 | Jung |
| 2003/0104862 A1 | 6/2003 | Acres | | 2006/0178964 A1 | 8/2006 | Jung |
| 2003/0104865 A1 | 6/2003 | Itkis | | 2006/0178965 A1 | 8/2006 | Jung |
| 2003/0106769 A1 | 6/2003 | Weiss | | 2006/0178966 A1 | 8/2006 | Jung |
| 2003/0115456 A1 | 6/2003 | Kapoor | | 2006/0178967 A1 | 8/2006 | Jung |

| | | | |
|---|---|---|---|
| 2006/0178968 | A1 | 8/2006 | Jung |
| 2006/0178970 | A1 | 8/2006 | Jung |
| 2006/0178972 | A1 | 8/2006 | Jung |
| 2006/0178975 | A1 | 8/2006 | Jung |
| 2006/0178985 | A1 | 8/2006 | Jung |
| 2006/0195376 | A1 | 8/2006 | Jung |
| 2006/0195377 | A1 | 8/2006 | Jung |
| 2006/0195378 | A1 | 8/2006 | Jung |
| 2006/0195394 | A1 | 8/2006 | Jung |
| 2006/0205481 | A1 | 9/2006 | Dominellil |
| 2006/0224505 | A1 | 10/2006 | Jung |
| 2006/0229976 | A1 | 10/2006 | Jung |
| 2007/0073582 | A1 | 3/2007 | Jung |
| 2007/0087822 | A1 | 4/2007 | Van Luchene |
| 2007/0167218 | A1 | 7/2007 | Rothschild |
| 2007/0168266 | A1 | 7/2007 | Questembert |
| 2007/0239523 | A1 | 10/2007 | Yi |
| 2008/0086759 | A1 | 4/2008 | Colson |
| 2009/0023490 | A1 | 1/2009 | Moshal et al. |
| 2010/0174600 | A1 | 7/2010 | Walker et al. |
| 2010/0227675 | A1 | 9/2010 | Luxton et al. |
| 2010/0248823 | A1 | 9/2010 | Smith |
| 2011/0151976 | A1 | 6/2011 | Holloway |
| 2011/0183749 | A1 | 7/2011 | Allen |
| 2011/0207525 | A1 | 8/2011 | Allen |
| 2011/0256924 | A1 | 10/2011 | McGhie et al. |
| 2011/0275432 | A1 | 11/2011 | Lutnick et al. |
| 2012/0041810 | A1 | 2/2012 | Hofer |

FOREIGN PATENT DOCUMENTS

| | | |
|---|---|---|
| AU | 2497399 | 11/1999 |
| AU | 2497499 | 11/1999 |
| AU | 2497599 | 11/1999 |
| AU | 199924973 | 11/1999 |
| AU | 199924974 | 11/1999 |
| AU | 199924975 | 11/1999 |
| AU | 3018500 | 11/2000 |
| AU | 200030185 | 11/2000 |
| EP | 0308224 | 3/1989 |
| EP | 0525363 | 2/1993 |
| EP | 0949596 | 10/1999 |
| EP | 1107196 | 6/2001 |
| EP | 1399897 | 3/2004 |
| GB | 2319381 | 5/1998 |
| GB | 2333879 | 8/1999 |
| GB | 2380687 | 4/2003 |
| JP | 8235276 | 9/1996 |
| JP | 2003132224 | 5/2003 |
| WO | W09215174 A1 | 3/1992 |
| WO | WO9215174 A1 | 3/1992 |
| WO | 9323817 | 11/1993 |
| WO | 9416781 | 8/1994 |
| WO | 9713228 | 4/1997 |
| WO | 9748078 | 12/1997 |
| WO | 9926176 | 5/1999 |
| WO | 9930256 | 6/1999 |
| WO | 9952051 | 10/1999 |
| WO | 9960503 | 11/1999 |
| WO | 0014665 | 3/2000 |
| WO | 0031658 | 6/2000 |
| WO | 0033159 | 6/2000 |
| WO | 0033222 | 6/2000 |
| WO | 0079461 | 12/2000 |
| WO | 0101282 | 1/2001 |
| WO | 0152078 | 7/2001 |
| WO | 0157617 | 8/2001 |
| WO | 0164306 | 9/2001 |
| WO | WO200506113 | 1/2005 |
| WO | 200582480 | 9/2005 |
| WO | 2006020413 | 2/2006 |
| WO | 2009094395 | 7/2009 |

OTHER PUBLICATIONS

"Amazon.com and Netflix.com Establish Promotional Relationship for the Sale and Rental of DVD Titles" Business Wire Dec. 4, 1998, 3 pp.

Brook, Valerie. "GM turns up the heat with plan to cross-sell some financial products." Nov. 18, 1994 http://www.americanbanker.com/issues/159_150/-49630-1.html?zkPrintable=true.

"Beneficial, Casual Male Team Up on Card", American Banker. May 4, 1998. http://www.americanbanker.com.

"E-Centives," (http://www.emaginet.com/de...memfaq.shtml), download date: May 23, 1999, 3 pp. X.

Bloom, Jennifer Kingson. "Wal-Mart on Retail Road Less Traveled: Cobranding," The American Banker Sep. 11, 1998, 3 pp.

Elkin, Tobi "Promotions: Mastercard Wins Coveted On-Pack Real Estate in Tie-in with Microsoft" Brandweek Sep. 14, 1998, 1 page.

"Microsoft and First USA Announces $90 Million Online Advertising Alliance" EDP Weekly's IT Monitor Nov. 2, 1998, 2 pp.

Feldman, Amy "Paying with Plastic Not Such a Smart Idea", New York Daily News Nov. 4, 1998, 2 pp.

Cowell, Alan "America's Turn to Colonize; Creditcard Issuers Invade Britain, with U.S. Firepower", The New York Times Nov. 12, 1998, 5 pp.

Armstrong, Larry, "The Free-PC Game: Lure 'Em in and Lock 'Em Up," Business Week, Information Technology, Jul. 19, 1999, 1 pg.

"Shoppers Charge Accounts Co. to Administer Private Label Credit Card for Lew Magram LTD; Program Marks SCA,s Entry into Retail Catalog/Mail Order Industry" PR Newswire Jun. 29, 1998, 6 pp.

"About Click Rewards." Wired Magazine. http://www.wired.com/wired/subscribe/clickmiles.html.

Souccar, Miriam K. "Epidemic of Rate Shopping Spurs a Search for remedies," Jan. 7, 1999, Copyright 1999 American Banker, Inc.

"Wellsparks Group Launches V.I.P. Rewards; The Most Comprehensive Relationship Marketing Program Ever Created by a Mall Developer", Business wire May 19, 1998, 2 pp.

"Jay Jacobs Inc. Introduces Private Label Credit Card", Business Wire May 18, 1998, 1 page.

Meece, Mickey "Big Finance Companies May Want Piece of Limited's Private-Label Card Program", The American Banker Apr. 12, 1995, 2 pp.

"Points Earn Little Credit as Cardholders Fail to Cash in" Birmingham Post May 9, 1998, 2 pp.

"Card Briefs: Beneficial, Casual Male Team Up on Card" The American Banker May 4, 1998 1 pg.

AAdvantage Auction "Experience More with You AAdvantage Miles". http://www.aa.com/il8n/urls/auction.jsp?anchorLocation=DirectURL&title=auction.

Wald, Matthew L. "Spending It; Untying Cellular Phones From Those Annual Contracts" The New York Times Mar. 15, 1998, 2 pp.

Wijnen, Renee "Cendant Eyes Cross-Marketing Opportunities; CUC International-HFS Inc. Merger Expected to Yield an Additional 2 Million Club Members" DM News Feb. 2, 1998, 2 pp.

Sanders, Edmund "Tricky Business; The Magic of Rebate Cards can Quickly Disappear", Chicago Tribune Aug. 18, 1997, 3 pp.

Simon, Ruth "Make Sure Your Rebate Card Still Delivers the Goods", Money Aug. 1997, 2 pp.

Selasky, Susan "Easy-To-Swallow Savings; Diner Credit Cards Serve Wide menu of Discounts", Pittsburgh Post-Gazette Dec. 5, 1996, 3 pp.

"Chemical Bank and AT&T Smart Cards form Strategic Alliance", www.att.com/press/1193/931117.blb.html, 3 pp.

Kristof, Kathy "Card Sharks are in Season; be Wary of Discounts and Rebates as You Shop Around for Good Credit Deals", Chicago Tribune, Nov. 23, 1993, 2 pp.

Wessel, Harry "Rewarding Experience?; Credit Cards Offering Bonuses Not for Everyone", Chicago Poet-Gazette Dec. 5, 1996, 3 pp.

Ross, Chuck et al., "Coke Card promotion set for '98", (http //adage com/news.sub.—and.sub.—features/features/19971117/article3 html), Copyright Nov. 1997, 2 pp.

Singletary, Michelle, "Electronic World, Unchecked Problem?", The Washington Post, Mar. 4, 1997, Section: Financial, p. C01, 4 pp.

Ellin, Abby, "Listening to an Earful for Savings," (Hear the Pitches and talk for Free), The New York Times, Jan. 24, 1999, 1 pg.

Cox, Beth, "Visa, Travelweb Enter Online Marketing Partnership," Internetnews.com, Jan. 21, 1999, 1 pg.

Tedesco, Richard. "Pactel Pushes Net Access." Broadcasting & Cable. Jun. 3, 1996, pp. 64-65.

Colman, Price. "Cross-marketing Cuts Cable Bills." Broadcasting & Cable. Jul. 15, 1996, p. 44, 2 pp.

O'Brien, Timothy L., "The Market: Market Place—Taking the Danger out of Danger out of Risk; Chase says Models Helped it avoid Financial Minefields," The New York Times Business/Financial Desk, Jan. 20, 1999 Section C. col. 2 at p. 1, 4 pp.

"Rent from NetFlix.com Buy from Amazon.com," Official Press Release, Jan. 17, 1999, 1 pg.

"Let's Play the Cash Register Receipts Lottery", The New York Times, Dec. 25, 1990, Section: Section 1, p. 30, col. 4, Editorial Desk, 1 pg.

Dennis, Sylvia. "Visa Gets ready for Interactive Set-Top Boxes," Newsbytes, Dec. 14, 1998, 2 pp.

"Philips offers customers financing through Citicorp; Philips Medical Systems North America, Citicorp North America Inc." Health Industry Today, Jun. 1991, Section: vol. 54, No. 6, p. 4, ISSN: 0745-4678, 1 page.

Sinclair, Stewart. "To Mail or Not to Mail?" Strategy, Strategy Directresponse Special Report, Couponing, Oct. 12, 1998 at p. D21, 4 pp.

"Winn-Dixie/The Salvation Army Report Contributions for War Against Hunger", PR Newswire, Jun. 10, 1993, Section: Financial News, 1 pg.

Armstrong, Larry. "Coupon Clippers, save Your Scissors," Vons Supermarkets are Revolutionizing the Delivery of Discounts. Business week, Jun. 20, 1994, No. 3377 at p. 164, 2 pp.

Patch, Kimberly, "Sled InterNIC Debut Internet Services; Sled Corp Offers Electronic Coupons for Encryption software; InteNIC Information Services Launches InfoGuide to Internet Computer Network" PC Week, May 16, 1994 vol. 11 No. 19 at p. 130, ISSN: 0740-1604, 1 page.

"American Eagle Outfitters" PR Newswire. Mar. 26, 2010. www.printthis.clickability.com/pt/cpt?expire=&title=American+Eagle+Outfitters%2C+Inc.+Introduces+the . . . .

Andreoli, Tom et al., "Cash Machines Offer a Whole Lotto Money . . . ", Crain's Chicago Business, Jun. 19, 1995, Section: News, p. 8, 2 pp.

Brochure: "MyPoints (R)", MotivationNet, Inc. (TM), Homepage: www.mypoints.com, Copyright: Apr. 1998, 29 pp.

Bonnici, Joseph et al., "Consumer issues in coupon usage: An exploratory analysis", Journal of Applied Business Research, winter 1996/1997, vol. 13, No. 1, pp. 31-40, ISSNn: 0892-7626, CODEN: JPBEBK, 11 pp.

Hoeschen, Brad. "Brookfield Square Hopes Mall Card Strikes a Chord," Business Journal-Milwaukee, vol. 14, No. 50, p. 19, Sep. 12, 1997, 2 pp.

Armstrong, Larry. "The Free-PC Game: Lure 'Em in and Lock 'Em Up". Jul. 19, 1999 http://www.businessweek.com/1999/99_29/b3638169.htm?scriptFramed.

Iverson, Mark. "DataCard Partners With CSI to Offer Card-Based Loyalty Solution to Merchants." Jul. 19, 1998 http://www.thefreelibrary.com/_/print/PrintArticle.aspx?id=20883274.

"Cardbriefs: Stored-Value Card Designed for Casinos", The American Banker, Oct. 31, 1995, Section: Credit/Debit/ATMS, 1 pg.

"Tecmark Reward Terminal", (http //www tecmarkinc com/terminal htm), copyright, 1996 Tecmark Services, Inc., 1 pg.

WAP WTLS: Wireless Application Protocol Wireless Transport Layer Security Specification, Wireless Applications Forum, Limited, Apr. 30, 1998. [Retrieved on Jan. 19, 2009]. Retrieved from the Internet <Oct. 7, 2008>.

Fallon: "UK Retailers Loyal Customer 'Card Wars' Prove costly (Most major retailers in the UK have grown their sales over the past 2 years by lunching loyalty-card program" ; Supermarket News, May 5, 1997; vol. 47, No. 18, p. 57

Booker, Ellis, "Checkout lines to offer more than just candy and waiting", Computer World, May 21, 1990, 1 pg.

Fickenscher, Lisa, "Merchant: American Express Seeks to Mine Its Data on Cardholder Spending Patters", The American Banker, Mar. 24, 1997, Credit/Debit/ATMS, 2 pp.

Fickenscher, Lisa, "Amex to Start Free Rewards Program with Discounts on Merchandise", The American Banker, Oct. 18, 1996, Section: Credit/Debit/ATMS, p. 10, 2 pp.

Fitzgerald, Kate, "Amex program moves loyalty to next level: Custom Extras finds a medium customers can't ignore: Billing Statements", Advertising Age, Nov. 4, 1996, Section: News, 2 pp.

Amato-McCoy, Deena, "Co-Branded Acme Credit Card Rewards Loyal Users" Supermarket News, Jun. 15, 1998, Section: p. 17, ISSN: 0039-5803, 2 pages "DataCard Partners With CSI to Offer Card-Based Loyalty Solution to Merchants", Business Wire, Jul. 9, 1998, 1 pg.

Albright, Mark, "Grocery savings via Web coupons", St. Petersburg Times, Jul. 22, 1998, Section: Business, 2 pp.

Notice of Allowance; U.S. Appl. No. 13/441,365; Mailing Date Jun. 16, 2012.

Non Final Rejection dated May 4, 2012; U.S. Appl. No. 13/428,656; pp. 1-6.

Notice of Allowance; U.S. Appl. No. 13/428,656; Mailing Date May 15, 2012.

Non Final Rejection dated Mar. 6, 2012; U.S. Appl. No. 13/359,120; pp. 1-7.

Notice of Allowance; U.S. Appl. No. 13/359,120; Mailing Date Apr. 18, 2012.

Non Final Rejection dated Mar. 12, 2012; U.S. Appl. No. 13/359,104; pp. 1-8.

Notice of Allowance; U.S. Appl. No. 13/359,104; Mailing Date Apr. 13, 2012.

Non Final Rejection dated Mar. 6, 2012; U.S. Appl. No. 13/359,080; pp. 1-11.

Notice of Allowance; U.S. Appl. No. 13/359,080; Mailing date Apr. 11, 2012.

Non Final Rejection dated Jan. 10, 2012; U.S. Appl. No. 12/759,506; pp. 1-10.

Notice of Allowance; U.S. Appl. No. 12/759,506; Mail date Mar. 5, 2012.

Non Final Rejection dated Dec. 15, 2012; U.S. Appl. No. 12/720,743; pp. 1-10.

Notice of Allowance; U.S. Appl. No. 12/720,743; Mailing date Jan. 24, 2012.

Non Final Rejection dated May 12, 2009; U.S. Appl. No. 11/420,255; pp. 1-7.

Notice of Allowance; U.S. Appl. No. 11/420,255; Mailing Date Dec. 16, 2009.

US 8,313,023 B1

EXCHANGE OF NON-NEGOTIABLE CREDITS OF AN ENTITY'S REWARDS PROGRAM FOR ENTITY INDEPENDENT FUNDS

CROSS-REFERENCE TO RELATED APPLICATIONS

This continuation application claims the benefit of U.S. patent application Ser. No. 11/420,255 filed 25 May 2006 entitled "Web Based Conversion of Non-Negotiable Credits Associated with an Entity to Entity Independent Negotiable Funds." The entire contents of U.S. application Ser. No. 11/420,255 are incorporated by reference herein.

BACKGROUND

The present disclosure relates to the field of exchanging non-negotiable credits for entity independent funds.

Entities often reward consumers for utilizing their services with non-negotiable credits, such as frequent flier miles, consumer loyalty points, and entertainment credits. These non-negotiable credits can be applied towards products and/or services provided by a granting entity or its affiliates. For example, consumers can apply frequent flyer credits towards the purchase of airline tickets or airline upgrades. In another example, a consumer can utilize purchase points from a credit card company to receive percentage discounts on goods provided by affiliates. In still another example, entertainment credits can be redeemed for prizes offered in a winnings storefront of an entertainment site.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective. For instance, airlines often limit the choice of travel dates, known as black-out dates, to which frequent flyer credits can be applied.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

Time can also be a factor for redeeming credits having an associated expiration date. A consumer's non-negotiable credits may expire before a sufficient quantity is acquired for a desired purchase. Lesser purchases requiring fewer credits may not have a significant appeal for the consumer. Hence, credit expiration dates can further decrease the consumer value of non-negotiable credits.

Yet another problem with conventional implementation of non-negotiable credits is that consumers often belong to multiple credit-earning programs that provide the consumers with multiple incompatible forms of non-negotiable credit. Each of these multiple programs can span a single industry or can span multiple industries. For example, a consumer can acquire a moderate number of frequent flyer miles with multiple airlines, where each airline specific account contains insufficient credits to have any meaningful consumer value. Consumers can also have many different types of non-negotiable credits, such as multiple merchant specific credit, credit card credits, and frequent flier miles, each having different redemption values and program redemption rules. These different programs, values, and rules can understandably confuse and frustrate consumers, who due to their confusion, often elect to avoid participating in an entity sponsored credit program.

DETAILED DESCRIPTION

Figure 1:
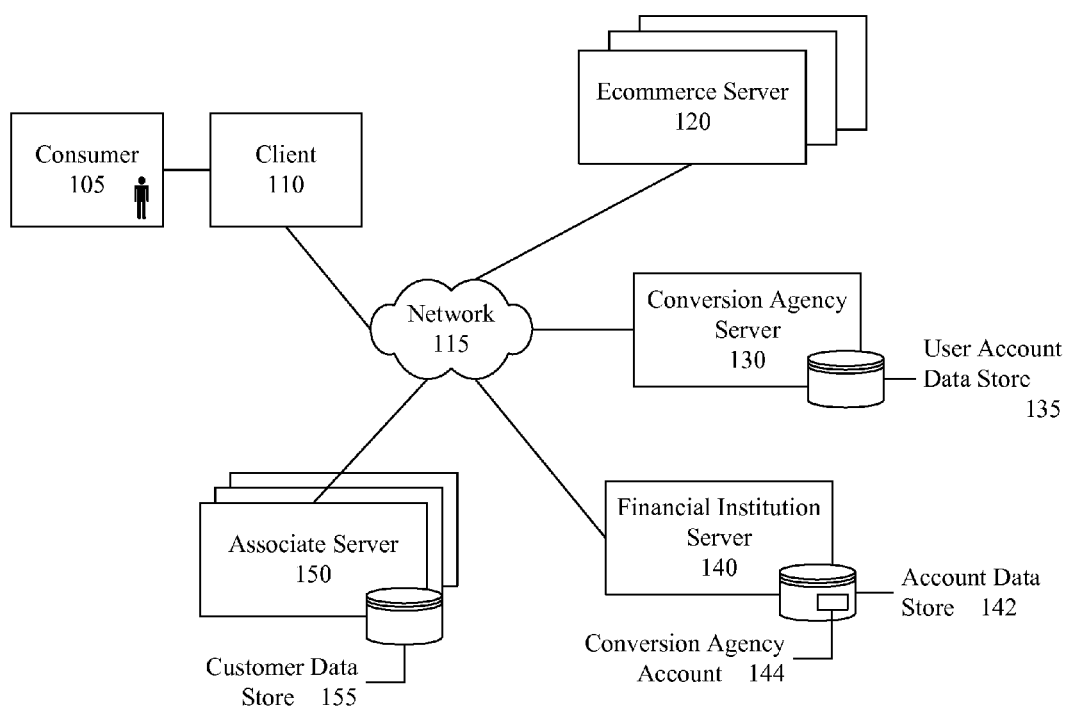
FIG. 1 is a schematic diagram of a Web based conversion of non-negotiable credits associated with an entity to entity independent funds system in accordance with an embodiment of the inventive arrangements disclosed herein.

The present disclosure permits consumers to transform non-negotiable credits provided by an entity to negotiable funds in an approximately immediate fashion using the Web. More specifically, a conversion agency can function as an intermediary that converts entity provided credits into entity independent funds. The conversion agency can be an independent entity that is not directly affiliated with the credit providing entities.

The conversion can occur automatically using a Web initiated action and can have approximately immediate results. Approximately immediate as used herein can signify that a transaction can occur within a single Web session with user acceptable delay tolerances, typically under half an hour and often under a few minutes. In one embodiment, credits can be automatically converted to funds as part of an e-commerce checkout. In another embodiment, credits can be converted into a user accessible account held with a financial institution.

The present disclosure can be implemented in accordance with numerous aspects consistent with material presented herein. For example, one aspect of the present disclosure can include a method for converting credits to funds. The method can include a step of a Web site receiving user identification information. Non-negotiable credits can be identified that are associated with an entity with which the user has previously interacted. The previous interactions could have earned the non-negotiable credits. Responsive to a user request, a conversion agency can convert a quantity of the non-negotiable credits into a quantity of negotiable funds. The conversion agency can be an agency not directly associated with the entity. The user can be permitted to access the quantity of negotiable funds. The quantity of negotiable funds can be applied to user specified purchases. At least a portion of the purchases can involve at least one vender that does not honor the non-negotiable credits.

Another aspect of the present disclosure can include a software method for converting non-negotiable credits into negotiable funds. The method can receive a user request to convert a quantity of non-negotiable credits held in a user account associated with an entity. A conversion rate between the non-negotiable credits available to the user and a form of negotiable funds can be automatically determined. A quantity of non-negotiable credits can be automatically subtracted from the user account. A quantity of the negotiable funds based upon the determined conversion rate and quantity of subtracted funds can be automatically transferred to a financial account. The financial account can be an account that is not associated with the entity. The entire method can occur in an approximately immediate fashion.

Still another aspect of the present disclosure can include a Web-based credit to fund conversion system. The system can include a non-negotiable credit account, a negotiable funds account, and a conversion agency. The non-negotiable credit account can be associated with an entity. Non-negotiable credits contained within the non-negotiable credit account can be earned though previous interactions between a user and the entity. The negotiable funds account can include negotiable funds that the user is able to apply to user specified e-commerce purchases. One or more venders involved in the e-commerce purchases can be venders that do not honor the non-negotiable credits for the e-commerce purchases. The conversion agency can automatically and approximately immediately convert a quantity of credits from the non-negotiable credit account to a quantity of funds in the negotiable funds account responsive to a request from the user.

It should be noted that various aspects of the disclosure can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

FIG. 1 is a schematic diagram of a Web based conversion of non-negotiable credits associated with an entity to entity independent funds system 100 in accordance with an embodiment of the inventive arrangements disclosed herein. System 100 includes consumer 105 and conversion agency server 130.

Consumer 105 interacts with conversion agency server 130 via client 110. Client 110 can be any of a variety of interfaces including, but not limited to, another human being, a personal computer, a kiosk, a graphical user interface (GUI), a Web page, a telephone, a personal data assistant (PDA), a mobile phone, and the like.

Client 110 can operate in a stand-alone fashion. Alternatively, client 110 can be a device that cooperatively participates in a network of distributed computing devices. Client 110 can also be another human being utilizing an alternate form of Client 110 to access conversion agency server 130 via network 115. Network 115 can facilitate data exchanges over wireless as well as line-based communication pathways and protocols.

Both consumer 105 and conversion agency server 130 can interact with associate server 150, e-commerce server 120, and financial institution server 140 via network 115. Conversion agency server 130 includes user account data store 135 in which consumer 105 is a member. Associate server 150 includes customer data store 155 in which consumer 105 is a member. Financial institution server 140 includes account data store 142. Account data store 142 includes conversion agency account 144 corresponding to conversion agency 130.

Consumer 105 earns non-negotiable credits from associate server 150. The quantity of these non-negotiable credits is saved in customer data store 155. The method in which consumer 105 earns credits can be any of a variety of activities including, but not limited to, making online purchases, making in-store purchases, playing online games, participating in online games of chance, participating in surveys, and the like. Consumer 105 uses conversion agency server 130 to convert the non-negotiable credits from associate server 150 into negotiable funds provided by e-commerce server 120 or financial institution 140. In one embodiment, conversion agency 130 can include multiple reward accounts of consumer 105.

For example, consumer 105 earns five hundred credits from participating in an online game of chance hosted by associate server 150. Consumer 105 can choose to use conversion agency 130 to convert any or all of these credits to a monetary equivalent. Conversion agency 130 withdraws the necessary amount from conversion agency account 144 contained within the account data store 142 of financial institution 140 and transfers it to an account specified by consumer 105. In another example, consumer 105 uses conversion agency 130 to complete a purchase at e-commerce server 120. Again, conversion agency 130 withdraws the necessary amount from conversion agency account 144 contained within the account data store 142 of financial institution 140 and transfers it to the account of e-commerce server 120.

E-commerce server 120 can be any Web site that supports online purchases of goods or services. In one embodiment, e-commerce server 120 can include a distinct payment option for conversion agency 130. This distinct payment option could process the conversion of credits through their Web site. Alternatively, the distinct payment option could launch an application to process the conversion of credit that is separate from their Web site. In another embodiment, associate server 150 can act as e-commerce server 120.

Financial institution server 140 can be any of a variety of entities including, but not limited to, a bank, a credit card company, an investment firm, and the like. In one embodiment, financial institution server 140 can reside in the same country as consumer 105 and/or associate server 150. In another embodiment, financial institution server 140 can reside in a country other than that of consumer 105 and/or associate server 150.

Figure 2:
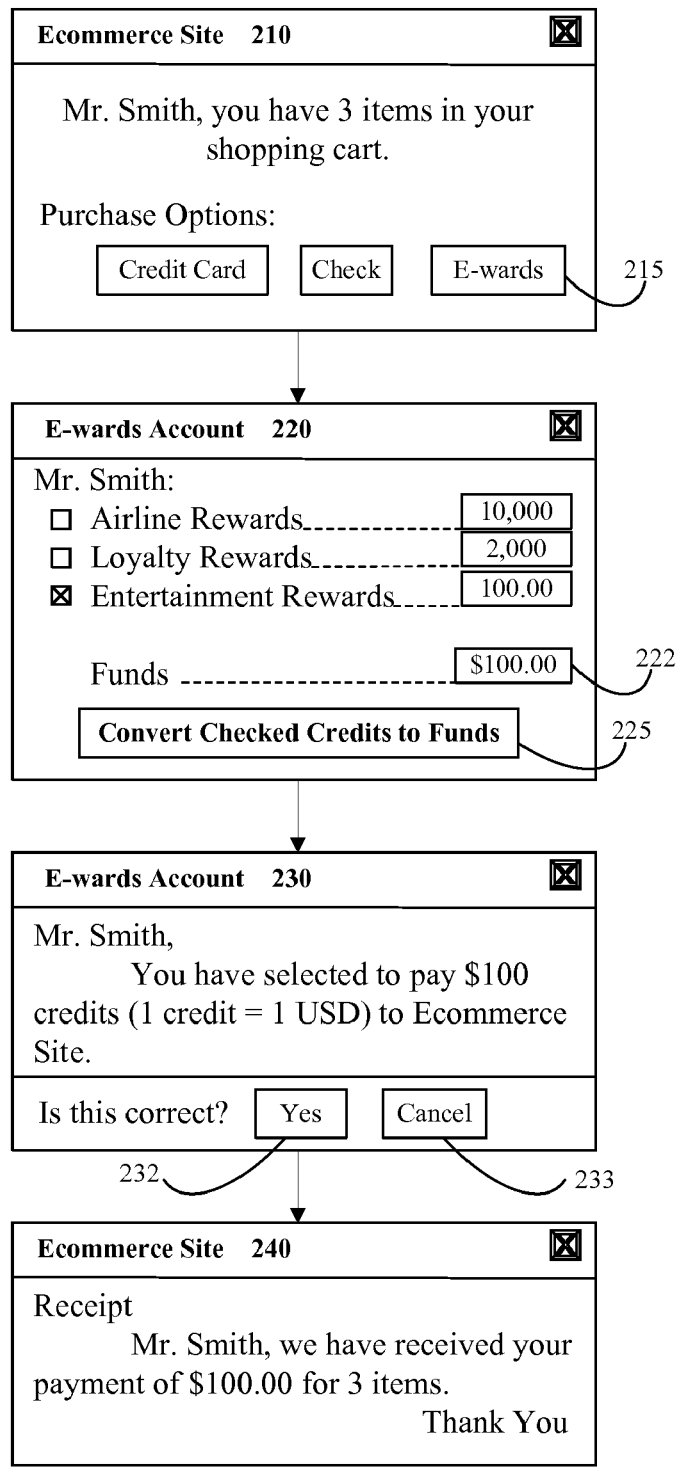
FIG. 2 is a schematic diagram of successive GUIs that illustrate the Web based conversion of non-negotiable credits associated with an entity to entity independent funds system in accordance with an embodiment of the inventive arrangements disclosed herein.

FIG. 2 is a schematic diagram of successive GUIs that illustrate the Web based conversion of non-negotiable credits associated with an entity to entity independent funds system 200 in accordance with an embodiment of the inventive arrangements disclosed herein.

GUI 210 can be a checkout window from any e-commerce site. GUI 210 includes payment button 215. Payment button 215 can represent a payment option that includes the conversion of non-negotiable credits to purchase the items in the shopping cart. Selection of payment button 215 by a user can produce GUI 220.

GUI 220 can be a display window from a conversion agency. GUI 220 includes display box 222 and button 225. GUI 220 can be rendered by any of a variety of means including, but not limited to, a Web browser, a JAVA applet, a PERL script, and the like. In one embodiment, GUI 220 can be contained within the e-commerce site. GUI 220 can display the balance of non-negotiable credits from one or more reward programs. GUI 220 contains a means by which the user selects the type of non-negotiable credits to convert including, but not limited to, a set of radio buttons, a set of checkboxes, a highlighting mechanism, and the like. Display box 222 can display the monetary value of the selected non-negotiable credits. The value displayed in display box 222 can be based on preset conversion factors. Button 225 can represent the initiation of the process by which the selected non-negotiable credits are converted to negotiable funds. Selection of button 225 by a user can produce GUI 230.

GUI 230 can be a display window from a conversion agency. GUI 230 includes yes button 232 and cancel button 233. GUI 230 can be rendered by any of a variety of means including, but not limited to, a Web browser, a JAVA applet, a PERL script, and the like. In one embodiment, GUI 230 can be contained within the e-commerce site. GUI 230 can display a summary message of the transaction initiated by GUI 220. GUI 230 can include a means to continue the transaction, yes button 232, and a means to cancel the transaction, cancel button 233. Selection of cancel button 233 by a user cancels the transaction and can return the user to GUI 220. Selection of yes button 232 by a user completes the transaction initiated in GUI 220 and can produce GUI 240.

GUI 240 can be a display window from the same said e-commerce site. GUI 240 can contain a message acknowledging the successful conversion of the user's non-negotiable credits into negotiable funds for the purchase of the items in the shopping cart.

Figure 3:
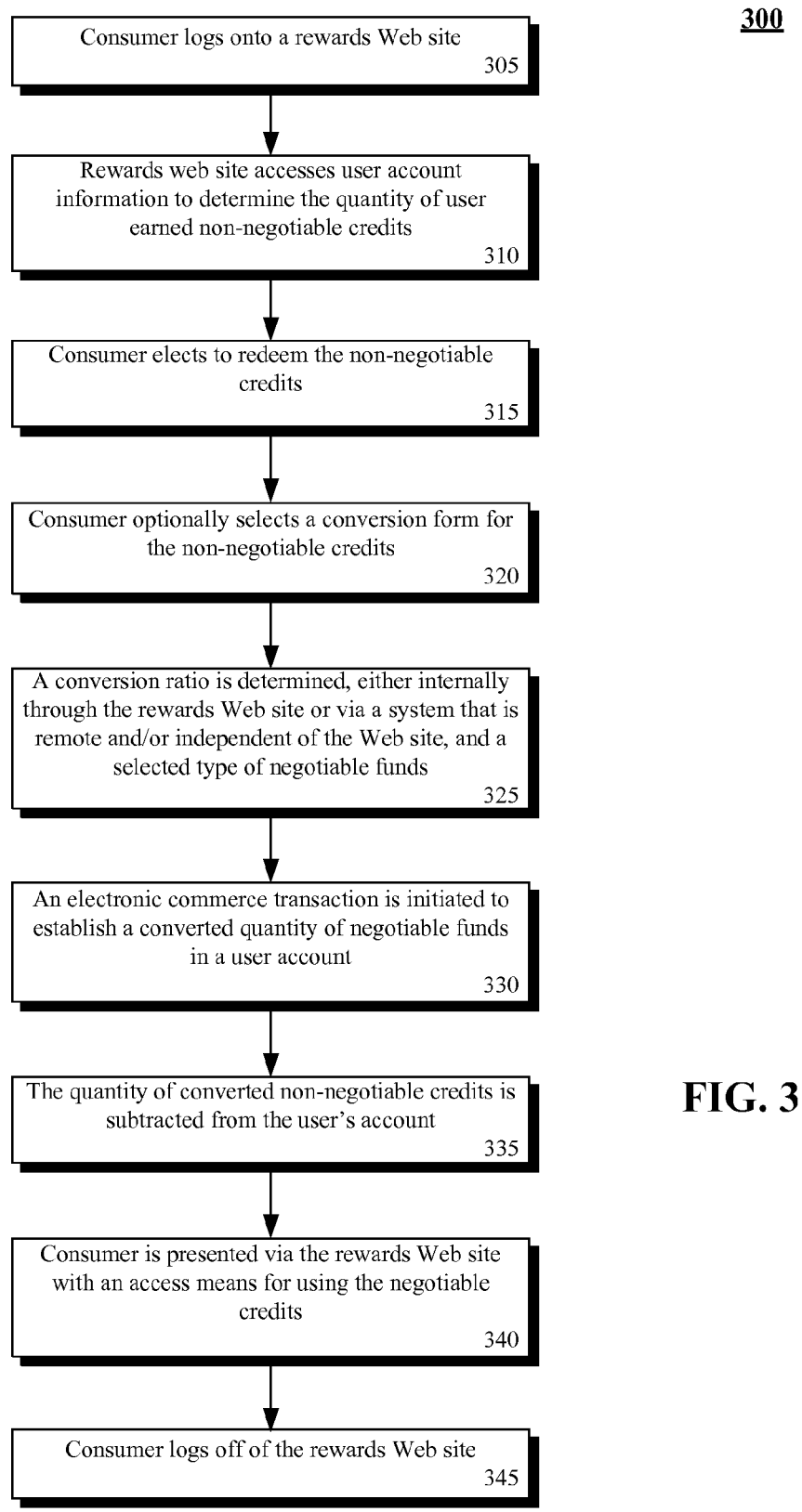
FIG. 3 is a flow chart of a method for the Web based conversion of non-negotiable credits associated with an entity to entity independent funds system in accordance with an embodiment of the inventive arrangements disclosed herein.

FIG. 3 is a flow chart of a method 300 for the Web based conversion of non-negotiable credits associated with an entity to entity independent funds system in accordance with an embodiment of the inventive arrangements disclosed herein.

Method 300 can begin in step 305, where a consumer logs onto a rewards Web site. In step 310, the rewards Web site utilizes the user information provided in step 305 to access the consumer's account information and display the amount of non-negotiable credits in the consumer's account. The consumer elects to redeem some quantity of non-negotiable credits in step 315. If supported by the rewards Web site, step 320 can occur in which the consumer can select the form of negotiable funds to convert the non-negotiable credits. In step 325, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 330 to establish the converted amount of negotiable funds in a user account. The quantity of converted non-negotiable credits is subtracted from the user's account in step 335. In step 340, the rewards Web site presents the consumer with an access means for the negotiable funds. Lastly, the consumer terminates the session by logging off the rewards Web site in step 345.

The present disclosure may be realized in hardware, software, or a combination of hardware and software. The present disclosure may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present disclosure also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This disclosure may be embodied in other forms without departing from the spirit or essential attributes thereof. Accordingly, reference should be made to the following claims, rather than to the foregoing specification, as indicating the scope of the disclosure.

What is claimed is:

1. A method comprising:
at least one of one or more computers identifying non-negotiable credits earned as part of a rewards program of an entity that provides a payment artifact, the non-negotiable credits being accrued or earned by charging amounts to an account linked to the payment artifact, the amounts charged being for goods or services purchased using the payment artifact, wherein the reward program credits are stored as digitally encoded information in at least one storage device, wherein the goods or services purchased are purchased from at least one different entity than the entity;
at least one of one or more computers receiving a request to transfer or convert a quantity of the non-negotiable credits to entity independent funds of a commerce partner, the commerce partner being a company that is not the entity; and
responsive to the request to transfer or convert the quantity of non-negotiable funds, at least one of one or more computers transferring or converting at least a subset of the non-negotiable credits into entity independent funds that the commerce partner accepts for goods or services that the commerce partner provides, wherein in absence of the non-negotiable credits being converted or transferred into the entity independent funds the commerce partner does not accept the non-negotiable credits for the goods or services that the commerce partner provides.

2. The method of claim 1, wherein the converting or transferring of the subset of the non-negotiable credits into entity independent funds permits access to the entity independent funds thereby enabling purchases of the goods or services that the commerce partner provides.

3. The method of claim 1, wherein charging amounts to the account linked to the payment artifact occurs as part of a set of previous interactions involving a member participating in the rewards program and the entity that provides the payment artifact.

4. The method of claim 1, wherein the one or more computers are computers for serving content of a Web site, wherein the Web site is used for converting or transferring the quantity of non-negotiable funds into the entity independent funds.

5. The method of claim 1, wherein a point of sale device is a device from which the request to transfer the quantity of the non-negotiable credits originates.

6. The method of claim 1, further comprising:
responsive to the transferring or converting of the subset of non-negotiable credits, at least one of the one or more computers subtracting the subset of non-negotiable credits from a total number of available non-negotiable credits earned through the rewards program.

7. The method of claim 1, further comprising:
at least one of the one or more computers identifying a ratio for transferring or converting the non-negotiable credits into entity independent funds; and
at least one of the one or more computers transferring or converting the subset of the non-negotiable credits into entity independent funds in accordance with the identified ratio.

8. The method of claim 1, wherein the payment artifact is a credit card, and wherein the non-negotiable credits are reward program points for the rewards program associated with the credit card.

9. The method of claim 1, wherein per terms of the rewards program, the non-negotiable credits have no cash or monetary value, wherein the non-negotiable credits are accrued in proportion to the amount charged to the account.

10. The method of claim 1, wherein the non-negotiable credits have a restriction on use related to an expiration date, whereby the non-negotiable credits either have an expiration date, have an expiration date triggered by a previously defined condition related to a status of the account linked to the payment artifact, or the entity has expressly reserved a right of imposing an expiration date on already accrued non-negotiable credits.

11. The method of claim 1, wherein a single one of the one or more computers performs the identifying of the non-negotiable credits, the receiving of the request, and the converting or transferring of the non-negotiable credits to entity-independent funds.

12. The method of claim 1, wherein a plurality of the one or more computers performs the identifying of the non-negotiable credits, the receiving of the request, and the converting or transferring of the non-negotiable credits to entity-independent funds.

13. The method of claim 1, wherein each of the one or more computers comprises computing equipment having at least one processor executing program instructions that are digitally encoded in at least one storage device.

14. The method of claim 1, wherein the entity charges members participating in the rewards program a fee for converting or transferring the non-negotiable credits into entity-independent funds.

15. The method of claim 1, wherein the entity-independent funds are loyalty points of a program of a company or organization that is not the entity.

16. A method comprising:
at least one of one or more computers establishing a rewards program for credit cards, the credit cards being referred to herein as payment artifacts, wherein each of the payment artifacts are provided by an entity to one or more card holders, wherein card holders participating in the rewards program are referred to herein as members;
at least one of one or more computers accruing non-negotiable credits, referred to as membership reward points, in response to one of the payment artifacts being used for purchases of goods or services with venders accepting the payment artifact, wherein a quantity of non-negotiable credits accrued is directly proportional to amounts spent for the purchases using the payment artifact, wherein the non-negotiable credits have restrictions on use, wherein the restrictions on use prevent the non-negotiable credits from being directly applied for a purchase of at least one goods or services of a commerce partner, wherein the commerce partner is an independent entity from the entity; and
at least one of one or more computers subtracting a quantity of the non-negotiable credits in response to the purchase of the goods or services, the purchase costing a quantity of entity independent funds, the entity independent funds resulting from a conversion of the subtracted quantity of non-negotiable credits into the entity independent funds in accordance with a credit to fund conversion ratio, wherein the entity provides compensation for the subtracted quantity of the non-negotiable credits, wherein the commerce partner receives at least a portion of the compensation.

17. The method of claim 16, wherein the compensation is in negotiable funds.

18. The method of claim 16, wherein a conversion agency converts the non-negotiable credits into the entity independent funds.

19. The method of claim 18, where the conversion agency is not the entity.

20. The method of claim 16, wherein each of the one or more computers comprises computing equipment having at least one processor executing program instructions that are digitally encoded in at least one storage device.

21. The method of claim 16, wherein a single one of the one or more computers performs the accruing and subtracting of the non-negotiable credits.

22. The method of claim 16, wherein the entity charges members participating in the rewards program a fee for converting or transferring the non-negotiable credits into entity independent funds.

23. The method of claim 16, wherein the entity-independent funds are loyalty points of a program of the commerce partner.

24. The method of claim 16, wherein the entity-independent funds are negotiable funds.

25. The method of claim 16, wherein per terms of the rewards program, the non-negotiable credits have no cash or monetary value, and wherein the non-negotiable credits have at least one restriction on use related to an expiration date, whereby the non-negotiable credits either have an expiration date, have an expiration date triggered by a previously defined condition related to a status of the account linked to the payment artifact, or the entity has expressly reserved a right of imposing an expiration date on already accrued non-negotiable credits.

26. The method of claim 16, wherein the entity provides the non-negotiable credits to incentive the card holders to utilize the payment artifacts for the purchase with venders, wherein the entity charges the venders that accept the payment artifact in accordance with a vender charged ratio of the amounts spent.

27. A method comprising:
at least one of one or more computers establishing an account for non-negotiable credits provided by an entity to one or more users, wherein the established account is a rewards program account, wherein the non-negotiable credits are reward program points, wherein the entity provides credit cards to the one or more users, wherein usage of the credit cards earns the reward program points;
at least one of one or more computers detecting interactions in which one of the credit cards is utilized for one or more purchases, each of the interactions earning a quantity of non-negotiable credits, wherein the quantity of non-negotiable credits from the interactions are added to the account, wherein in absence of a conversion operation that converts the non-negotiable credits to entity independent funds, the at least one commerce partner does not accept the non-negotiable credits for a sale of goods or services provided by the commerce partner; and at least one of one or more computers subtracting a quantity of the non-negotiable credits from the account, the subtracted quantity of non-negotiable credits corresponding to a quantity of entity independent funds in accordance with a conversion rate established for the conversion operation that converts the non-negotiable credits to the entity independent funds, wherein the quantity of entity independent funds resulting from the conversion operation are able to be exchanged with the commerce partner for goods or services provided by the commerce partner.

28. The method of claim 27, wherein the entity-independent funds are negotiable funds.

29. The method of claim 27, wherein the entity-independent funds are loyalty points of a program of the commerce partner.

30. A computer program product comprising:
one or more non-transitory computer-readable medium;
program instructions, stored on at least one of the one or more non-transitory computer-readable mediums, to establish a rewards program for credit cards, the credit cards being referred to herein as payment artifacts, wherein each of the payment artifacts are provided by an entity to one or more card holders, wherein card holders participating in the rewards program are referred to herein as members;
program instructions, stored on at least one of the one or more non-transitory computer-readable mediums, to accrue non-negotiable credits, referred to as membership reward points, in response to one of the payment artifacts being used for purchases of goods or services with venders accepting the payment artifact, wherein a quantity of non-negotiable credits accrued is directly proportional to amounts spent for the purchases using the payment artifact, wherein the non-negotiable credits have restrictions on use, wherein the restrictions on use prevent the non-negotiable credits from being directly applied for a purchase of at least one goods or services of a commerce partner, wherein the commerce partner is an independent entity from the entity; and
program instructions, stored on at least one of the one or more non-transitory computer-readable mediums, to subtract a quantity of the non-negotiable credits in response to the purchase of the goods or services, the purchase costing a quantity of entity independent funds, the entity independent funds resulting from a conversion of the subtracted quantity of non-negotiable credits into the entity independent funds in accordance with a credit to fund conversion ratio, wherein the entity provides compensation for the subtracted quantity of the non-negotiable credits, wherein the commerce partner receives at least a portion of the compensation.

31. A method comprising:
a commerce partner agreeing to accept transfers or conversions of quantities of non-negotiable credits to entity independent funds in accordance with a credits-to-funds ratio, wherein the non-negotiable credits have been earned as part of a rewards program of an entity, wherein the commerce partner accepts the entity independent funds for goods or services that the commerce partner provides, wherein in absence of the non-negotiable credits being converted or transferred into the entity independent funds the commerce partner does not accept the non-negotiable credits for the goods or services that the commerce partner provides, wherein the entity-independent funds are loyalty points of a loyalty program of the commerce partner;

at least one of one or more computers detecting a communication over a network to grant a consumer a quantity of the entity independent funds, wherein the quantity of entity independent funds results from a conversion or transfer of at least a subset of the non-negotiable credits into the quantity of entity independent funds in accordance with the credit-to-funds ratio, wherein the subset of the non-negotiable credits are expended as part of the conversion or transfer, and wherein the commerce partner is compensated for providing the entity independent funds to the consumer;

responsive to the communication, at least one of one or more computers granting the consumer the quantity of the entity independent funds; and the at least one of the one or more computers accepting at least a portion of the quantity of entity independent funds in exchange for the goods or services that the commerce partner provides, wherein the one or more computers do not accept the non-negotiable credits of the entity's rewards program for the goods or services in absence of the conversion or transfer.

32. The method of claim 31, wherein the granting of the quantity of entity independent funds comprises:

at least one of the one or more computers accessing a loyalty program account for the loyalty program that the commerce partner maintains for the consumer; and at least one of the one or more computers adding the quantity of entity independent funds, referred to as loyalty points, to an existing quantity of loyalty points for the consumer, wherein records for the loyalty program account are maintained by the one or more computers within one or more non-transitory storage mediums.

33. The method of claim 32, further comprising:
at least one of the one or more computers completing a sale of the goods or services, where the consumer expends at least the portion of the quantity of entity independent funds in exchange for the goods or services that the commerce partner provides.

34. The method of claim 31, further comprising:
at least one of the one or more computers transferring or converting the subset of the non-negotiable credits into the quantity of entity independent funds in accordance with the credit-to-funds ratio.

35. The method of claim 31, wherein the entity, the commerce partner, or both charges members participating in the rewards program or the loyalty program a fee for converting or transferring the subset of non-negotiable credits into the quantity of entity-independent funds.

36. The method of claim 31, wherein a single one of the one or more computers detects the communication, grants the consumer the quantity of entity independent funds, and accepts the portion of the quantity of entity independent funds.

37. The method of claim 31, wherein a plurality of different ones of the one or more computers detects the communication, grants the consumer the quantity of entity independent funds, and accepts the portion of the quantity of entity independent funds.

38. The method of claim 31, wherein the one or more computers are owned by or operated for the commerce partner.

39. A computer program product comprising:

one or more non-transitory computer-readable mediums;

program instructions, stored on at least one of the one or more non-transitory computer-readable mediums, to detect a communication over a network to grant a consumer a quantity of entity independent funds, wherein the quantity of entity independent funds results from a conversion or transfer of at least a subset of non-negotiable credits into the quantity of entity independent funds in accordance with a credit-to-funds ratio, wherein the subset of the non-negotiable credits are expended as part of the conversion or transfer, and wherein the commerce partner is compensated for providing the entity independent funds to the consumer, wherein the commerce partner agrees to accept transfers or conversions of quantities of the non-negotiable credits to entity independent funds in accordance with the credits-to-funds ratio, wherein the non-negotiable credits have been earned as part of a rewards program of the entity, wherein the commerce partner accepts the entity independent funds for goods or services that the commerce partner provides, wherein in absence of the non-negotiable credits being converted or transferred into the entity independent funds the commerce partner does not accept the non-negotiable credits for the goods or services that the commerce partner provides, wherein the entity-independent funds are loyalty points of a loyalty program of the commerce partner;

one or more non-transitory computer-readable mediums;

program instructions, stored on at least one of the one or more non-transitory computer-readable mediums, to, responsive to the communication, grant the consumer the quantity of the entity independent funds; and program instructions, stored on at least one of the one or more non-transitory computer-readable mediums, to accept at least a portion of the quantity of entity independent funds in exchange for the goods or services that the commerce partner provides, wherein, per the program instructions, the non-negotiable credits are not accepted for the goods or services in absence of the conversion or transfer.

40. The computer program product of claim 39, wherein the program instructions to grant of the quantity of entity independent funds comprise:

program instructions, stored on at least one of the one or more non-transitory computer-readable mediums, to access a loyalty program account for the loyalty program that the commerce partner maintains for the consumer; and program instructions, stored on at least one of the one or more non-transitory computer-readable mediums, to add the quantity of entity independent funds, referred to as loyalty points, to an existing quantity of loyalty points for the consumer, wherein records for the loyalty program account are maintained by the one or more computers within one or more non-transitory storage mediums.

41. The computer program product of claim 39, further comprising:

program instructions, stored on at least one of the one or more non-transitory computer-readable mediums, to complete a sale of the goods or services, where the consumer expends at least the portion of the quantity of entity independent funds in exchange for the goods or services that the commerce partner provides.

42. The computer program product of claim 39, further comprising:

program instructions, stored on at least one of the one or more non-transitory computer-readable mediums, to transfer or convert the subset of the non-negotiable credits into the quantity of entity independent funds in accordance with the credit-to-funds ratio.

43. The computer program product of claim 39, wherein the entity, the commerce partner, or both charges members participating in the rewards program or the loyalty program a fee for converting or transferring the subset of non-negotiable credits into the quantity of entity-independent funds.

44. The computer program product of claim 39, wherein a single computer executes the program instructions to detect the communication, the program instructions to grant the consumer the quantity of entity independent funds, and the program instructions to accept the portion of the quantity of entity independent funds.

45. The computer program product of claim 39, wherein a plurality of different computers communicating with each other execute the program instructions to detect the communication, the program instructions to grant the consumer the quantity of entity independent funds, and the program instructions to accept the portion of the quantity of entity independent funds.

46. The computer program product of claim 39, wherein the one or more computers upon which the program instructions are loaded and executed are owned by or operated for the commerce partner.

\* \* \* \* \*

UNITED STATES PATENT AND TRADEMARK OFFICE
CERTIFICATE OF CORRECTION

| | | |
|---|---|---|
| PATENT NO. | : 8,313,023 B1 | Page 1 of 1 |
| APPLICATION NO. | : 13/531904 | |
| DATED | : November 20, 2012 | |
| INVENTOR(S) | : Sean I. McGhie and Brian K. Buchheit | |

It is certified that error appears in the above-identified patent and that said Letters Patent is hereby corrected as shown below:

On the Title Page

Item (63) in the RELATED U.S. APPLICATION DATA the words: ••continuation of Application No. 11/420,255, filed on May 25, 2006, now Pat. No. 7,703,673•• should be replaced with: ••continuation of Application No. 11/420,255, filed on May 25, 2006, now Pat. No. 7,703,673, and a continuation of Application No. 12/720,743, filed on March 10, 2010, now Pat. No. 8,123,127, and a continuation of Application No. 12/759,506, filed on April 13, 2010, now Pat. No. 8,162,209, and a continuation of Application No. 13/168,814, filed on June 24, 2011, now Pat. No. 8,376,224.••

In the Specification

Column 1, lines 9-14 in the CROSS-REFERENCE TO RELATED APPLICATIONS the words:
••This continuation application claims the benefit of U.S. patent Ser. No. 11/420,255 filed May 2006 entitled ••Web Based Conversion of Non-Negotiable Credits Associated with an Entity to Entity Independent Negotiable Funds". The entire contents of U.S. Application Ser. No. 11/420,255 are incorporated by reference herein.•• should be replaced with: ••This continuation application claims the benefit of U.S. patent Ser. No. 11/420,255 filed May 2006 entitled ••Web Based Conversion of Non-Negotiable Credits Associated with an Entity to Entity Independent Negotiable Funds, now Pat. No. 7,703,673. Priority to Pat. No 7,703,673 is through Pat. No. 7,123,127 (filed March 10, 2010 and issued Feb 28, 2012) and/or Pat. No. 8,162,209 (filed April 13, 2010 and issued April 24, 2012) and Pat. No. 8,876,224 (filed June 24, 2011 and issued February 19, 2013, which claims priority to Patent No. 7,703,673 through Pat. No 7,123,127 and Pat. No 8,162,209). The entire contents of U.S. Application Ser. No. 11/420,255 are incorporated by reference herein.••

Signed and Sealed this
Fourth Day of November, 2014

Michelle K. Lee
*Deputy Director of the United States Patent and Trademark Office*